United States Patent
Lee et al.

(10) Patent No.: US 10,823,123 B2
(45) Date of Patent: Nov. 3, 2020

(54) QUICK CONNECTOR

(71) Applicants: HYUNDAI MOTOR COMPANY, Seoul (KR); KIA MOTORS CORPORATION, Seoul (KR)

(72) Inventors: Seung Yeub Lee, Gwangju (KR); Hee Jin Jung, Anyang-si (KR); Young Gun Cho, Busan (KR); Se Jin Han, Seoul (KR); Jin Ha Jeong, Seoul (KR); Jeong Woo Kang, Seoul (KR); So Hyun Park, Yongin-si (KR); Ji Youn Han, Gimpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 102 days.

(21) Appl. No.: 15/717,288

(22) Filed: Sep. 27, 2017

(65) Prior Publication Data

US 2018/0119859 A1    May 3, 2018

(30) Foreign Application Priority Data

Nov. 2, 2016 (KR) .......................... 10-2016-0144865

(51) Int. Cl.
*F02M 37/00* (2006.01)
*F16L 37/133* (2006.01)
(Continued)

(52) U.S. Cl.
CPC ........ *F02M 37/0017* (2013.01); *F02M 37/00* (2013.01); *F16L 37/122* (2013.01);
(Continued)

(58) Field of Classification Search
CPC ..... F16L 37/122; F16L 37/133; F16L 37/138; F16L 37/142; F16L 37/0841; F16L 37/12;
(Continued)

(56) References Cited

U.S. PATENT DOCUMENTS 5,178,424 A * 1/1993 Klinger ............... F16L 37/0985
285/319
7,318,609 B2 * 1/2008 Naito .................... F16L 37/133
285/307

(Continued)

FOREIGN PATENT DOCUMENTS

JP    2010-509553 A    3/2010
JP    2011-140988 A    7/2011
(Continued)

*Primary Examiner* — Matthew Troutman
*Assistant Examiner* — William S. Choi
(74) *Attorney, Agent, or Firm* — McDonnell Boehnen Hulbert & Berghoff LLP

(57) ABSTRACT

A quick connector is provided. The quick connector is configured to be coupled to a locking ring provided around an outer peripheral surface of a tube, through which fluid flows in or out. The quick connector includes a main body, which accommodates the tube therein and includes locking members, formed to be locked by the locking ring and being bent toward the locking ring, and a mounting guide coupled to the outer peripheral surface of the main body and accommodating the locking members therein. The mounting guide is configured to slide along the longitudinal axis of the main body so as to enable the locking members to be locked around the locking ring or to be released from the locked state.

6 Claims, 4 Drawing Sheets

(51) Int. Cl.
  *F16L 37/138* (2006.01)
  *F16L 37/12* (2006.01)
  *F16L 37/14* (2006.01)

(52) U.S. Cl.
  CPC .......... *F16L 37/133* (2013.01); *F16L 37/138* (2013.01); *F16L 37/142* (2013.01)

(58) Field of Classification Search
  CPC ..... F16L 37/08; F02M 37/00; F02M 37/0017; F02M 37/22
  USPC .............................. 285/1, 323, 305, 307, 308
  See application file for complete search history.

(56) References Cited

U.S. PATENT DOCUMENTS

| | | | | |
|---|---|---|---|---|
| 7,494,156 B2* | 2/2009 | Okada | ................ | F16L 37/0987 |
| | | | | 285/319 |
| 2002/0125721 A1* | 9/2002 | Imaeda | ............... | F16L 37/0985 |
| | | | | 285/305 |
| 2008/0036206 A1* | 2/2008 | Li-guo | ................ | F16L 37/0985 |
| | | | | 285/322 |

FOREIGN PATENT DOCUMENTS

| | | |
|---|---|---|
| KR | 10-2012-0049656 A | 5/2012 |
| KR | 10-1282642 B1 | 7/2013 |
| KR | 10-1354156 B1 | 1/2014 |

\* cited by examiner

QUICK CONNECTOR

CROSS-REFERENCE TO RELATED APPLICATION

This application claims under 35 U.S.C. § 119(a) the benefit of and priority to Korean Patent Application No. 10-2016-0144865 filed on Nov. 2, 2016, the entire contents of which are incorporated herein by reference.

BACKGROUND

(a) Technical Field

The present disclosure relates to a quick connector. More particularly, it relates to a quick connector that is characterized by reducing manufacturing costs and improving engagement/disengagement performance.

(b) Background Art

In general, among various components of a vehicle, for example, a fuel supply device may be configured such that a fuel filter continuously delivers fuel, a pressure regulator maintains a uniform internal pressure in a fuel supply pipe (about 3.3 kg/cm$^2$), excess fuel is returned to a fuel tank via a return pipe, and the fuel, which is maintained at a constant pressure, is sprayed into the engine via an injector.

The fuel filter may be connected with a first connection nozzle to receive fuel to be filtered, and may also be connected with a second connection nozzle to deliver the filtered fuel to the engine.

The fuel filter is mounted with a connector to facilitate connection with the connection nozzle. However, when the connector is coupled to one end of the fuel filter, it is difficult to remove the connector from the fuel filter, which leads to inconvenience in repair and maintenance.

Therefore, there is an urgent need for development of a connector that is capable of easily engaging and disengaging the fuel filter and the fuel nozzle with/from each other while ensuring secure connection therebetween and that is also capable of reducing manufacturing costs.

The above information disclosed in this Background section is only for enhancement of understanding of the background of the disclosure, and therefore it may contain information that does not form the prior art that is already known in this country to a person of ordinary skill in the art.

RELATED ART DOCUMENT

[Patent Document]
Korean Patent Publication No. 10-2012-0049656 (May 17, 2012)

SUMMARY OF THE DISCLOSURE

The present disclosure addresses the above-described problems associated with the prior art, and it is an object of the present disclosure to provide a quick connector, in which a connector body is provided with locking members, which are configured to be locked by a locking ring provided around a tube, and wherein the locking members are locked by the locking ring or released from the locked state merely by sliding a mounting guide coupled to the connector body, thereby easily engaging or disengaging the connector body with/from the locking ring.

In one aspect, the present disclosure provides a quick connector configured to be coupled to a locking ring provided around an outer peripheral surface of a tube, through which fluid flows in or out, the quick connector comprising a main body accommodating the tube therein and including at least one locking member formed to be locked by the locking ring and being bent toward the locking ring, and a mounting guide coupled to an outer peripheral surface of the main body and accommodating the locking members therein, the mounting guide being configured to slide in a longitudinal direction of the main body so as to enable the locking members to be locked by the locking ring or to be released from a locked state.

In a preferred embodiment, the main body may further include a body member formed to correspond to the shape of the tube so as to communicate with the tube, and at least one connector that extends a predetermined length from the body member and is formed to protrude and is positioned to face both sides of the locking ring. The locking member may be bent at respective ends of the at least one connector toward the locking ring so as to be locked by the locking ring.

In another preferred embodiment, the main body may further include at least one movement guide formed on a circumferential surface of the body member, each movement guides being formed in a slot shape having a predetermined insertion area so as to guide a sliding motion of the mounting guide.

In still another preferred embodiment, the mounting guide may have a coupling hole formed at a position corresponding to the position of each of the movement guides, and the mounting guide may include a retainer coupled in the coupling hole and the retainer has one end portion formed to be inserted into each of the movement guides and moves along the insertion area.

In yet another preferred embodiment, the locking members may be provided in pairs, and the locking members provided in pairs may be formed to be locked by the locking ring, may be made of an elastic material, and may be arranged to have a distance therebetween that is longer than an outer diameter of the locking ring in an initial position.

In still yet another preferred embodiment, when the mounting guide slides toward the locking members in the longitudinal direction of the main body, the mounting guide may press the locking members so that the distance between the locking members in the initial position is changed to a value corresponding to the outer diameter of the locking ring.

It is understood that the term "vehicle" or "vehicular" or other similar term as used herein is inclusive of motor vehicles in general such as passenger automobiles including sports utility vehicles ("SUV"), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Other aspects and preferred embodiments of the disclosure are discussed below.

BRIEF DESCRIPTION OF THE DRAWINGS

The above and other features of the present disclosure are described in detail with reference to certain example embodiments thereof illustrated in the accompanying drawings which are given hereinbelow by way of illustration only, and thus are not limitative of the present disclosure, and wherein.

Figure 1:
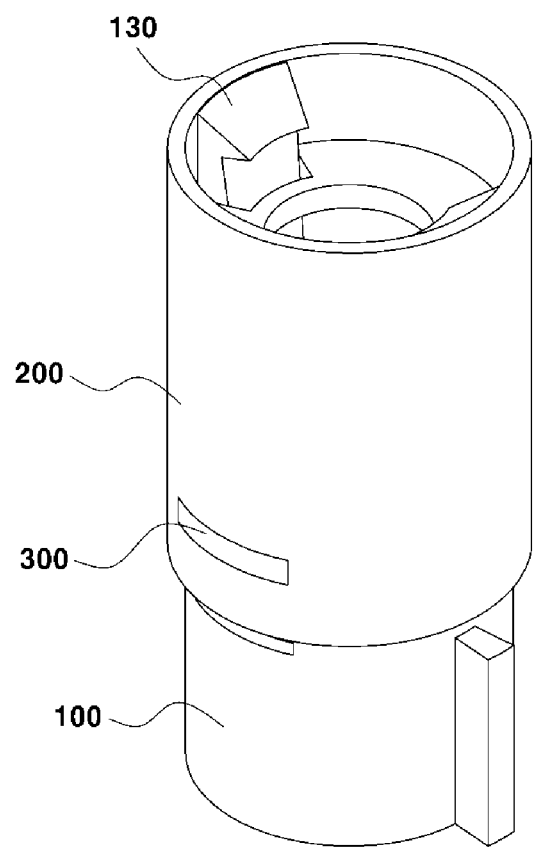
FIG. 1 is a view showing a quick connector according to an example embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present disclosure, examples of which are illustrated in the accompanying drawings and described below. While the disclosure describes various example embodiments, it will be understood that the present description is not intended to limit the disclosure to those example embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 2:
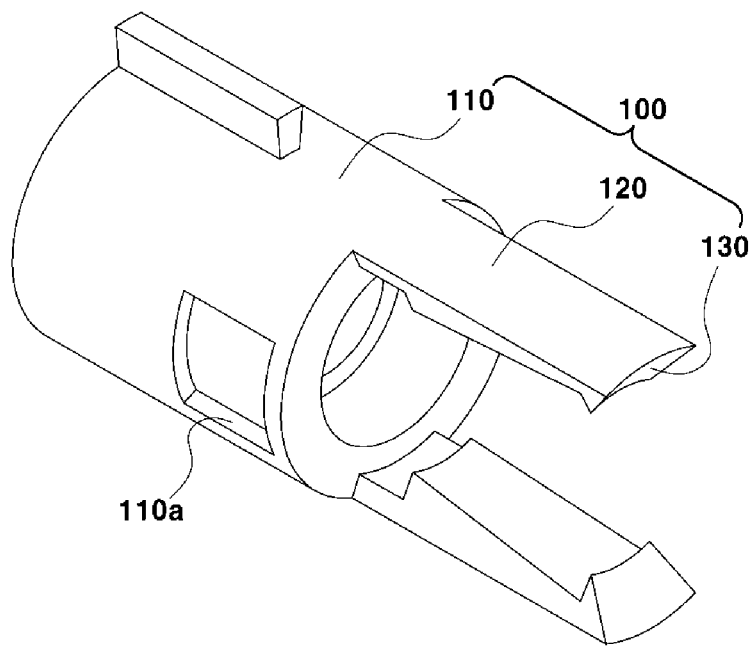
FIG. 2 is a view showing a main body of the quick connector according an example embodiment of the present disclosure.
Figure 3:
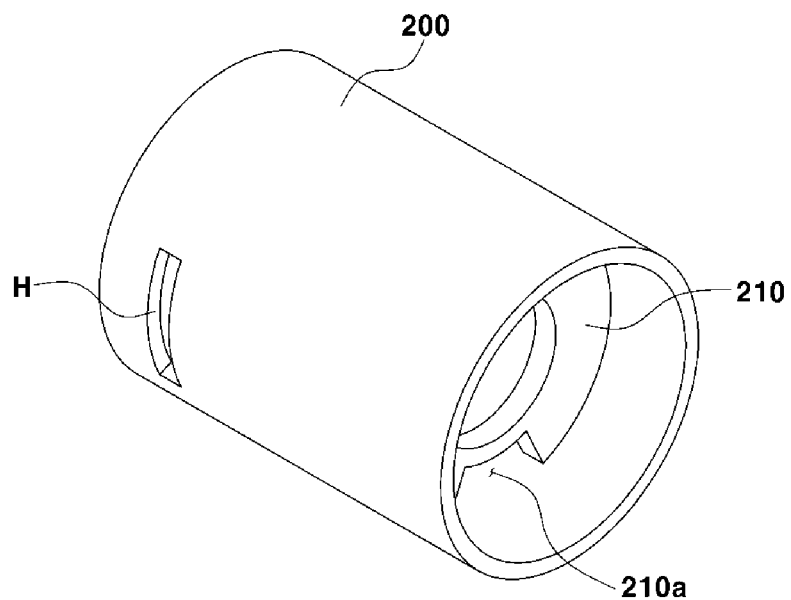
FIG. 3 is a view showing a mounting guide of the quick connector according to an example embodiment of the present disclosure.

FIG. 1 is a view showing a quick connector according to an example embodiment of the present disclosure, FIG. 2 is a view showing a main body of the quick connector according to an example embodiment of the present disclosure, and FIG. 3 is a view showing a mounting guide of the quick connector according to an example embodiment of the present disclosure.

Figure 4:
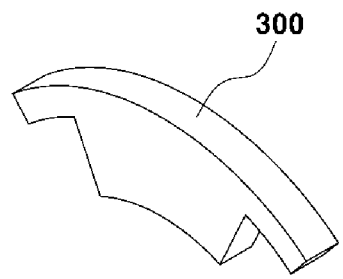
FIG. 4 is a view showing a retainer of the quick connector according to an example embodiment of the present disclosure.
Figure 5:
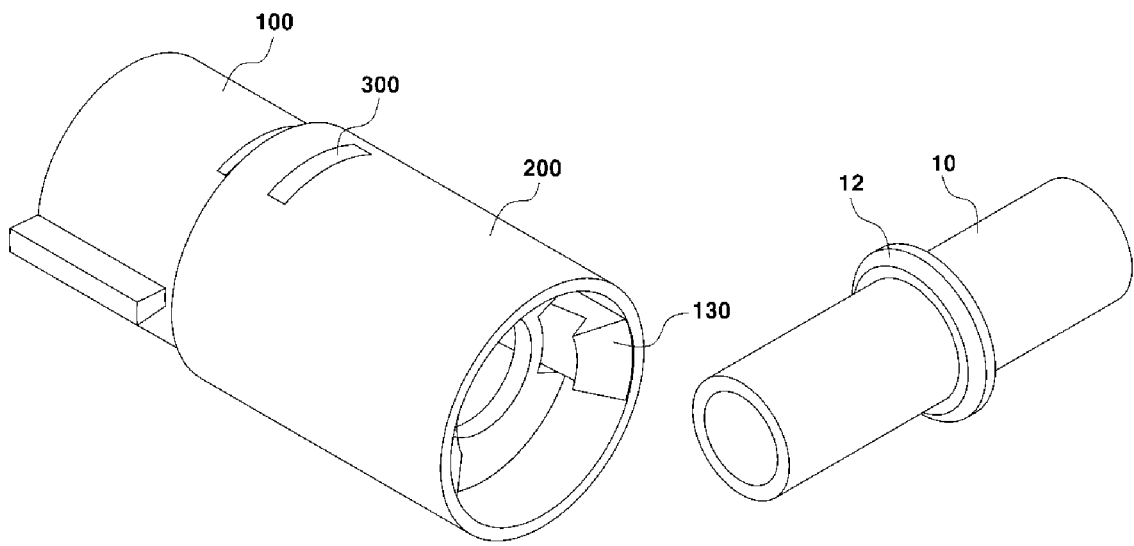
FIG. 5 is a view showing the state in which the mounting guide is engaged to the quick connector according to an example embodiment of the present disclosure.
Figure 6:
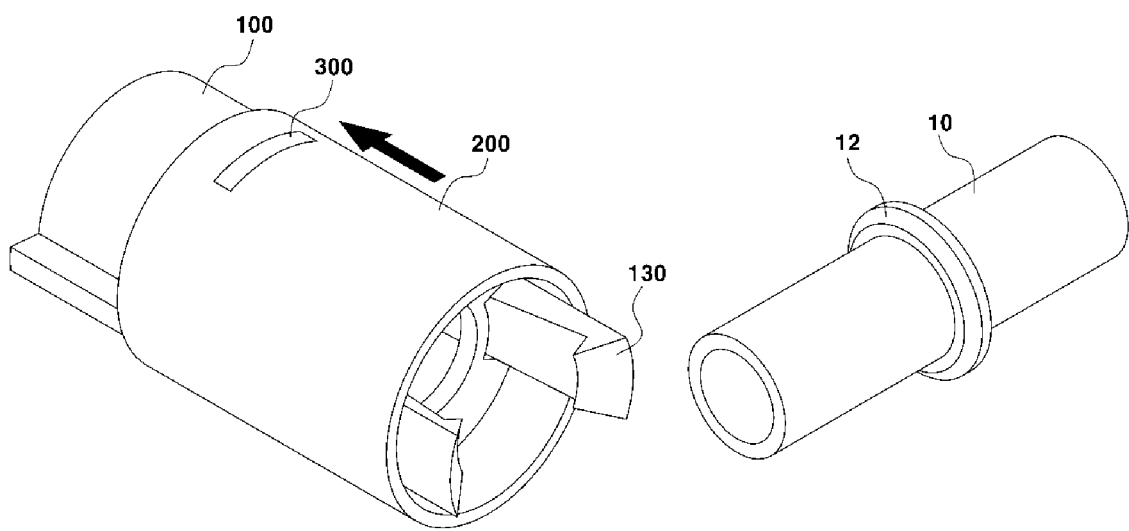
FIG. 6 is a view showing the state in which the mounting guide is disengaged from the quick connector according to an example embodiment of the present disclosure.

FIG. 4 is a view showing a retainer of the quick connector according to an example embodiment of the present disclosure, FIG. 5 is a view showing the state in which the mounting guide is engaged to the quick connector according to an example embodiment of the present disclosure, and FIG. 6 is a view showing the state in which the mounting guide is disengaged from the quick connector according to an example embodiment of the present disclosure.

As shown in FIG. 1, a quick connector includes a main body 100 and a mounting guide 200.

The main body 100 accommodates a tube 10 (shown in FIG. 5), through which fluid flows in or out. Main body 100 moves in the longitudinal direction of tube 10, and is positioned so as to be in contact with a locking ring 12, which is formed around the outer peripheral surface of tube 10.

Main body 100 includes locking members 130, which extend a predetermined length toward the locking ring 12 and can be locked by insertion of the locking ring 12 of tube 10.

Main body 100 is connected to tube 10 and sliding mounting guide 200 such that locking ring 12 is held by locking members 130. Main body 100, as shown in FIG. 2, includes a body member 110, connectors 120, and locking members 130.

Body member 110 is configured to have a cylindrical shape corresponding to the shape of tube 10 so as to communicate with the tube 10.

Connectors 120 extend a predetermined length from one end of body member 110 and are mounted to protrude toward locking ring 12. Connectors 120 are provided in pairs and are positioned to face opposite sides of locking ring 12.

Each of locking members 130 has a hook shape such that it is bent from one end of the corresponding connection member 120 toward the inside of main body 100 so as to enclose locking ring 12 and lock in place.

It is preferable for locking members 130 to have a length equal to or shorter than the height of the locking ring 12 from the outer peripheral surface of the tube 10. Further, in the initial position, it is preferable for the distance between locking members 130 to be greater than the outer diameter of locking ring 12, which protrudes around the outer peripheral surface of tube 10.

In addition, it is preferable for locking members 130 to be made of an elastic material. When mounting guide 200 performs a sliding motion in the above-described initial position, the distance between the pair of locking members 130 is elastically changed so as to correspond to the outer diameter of locking ring 12, thus facilitating the engagement between the main body 100 and the tube 10. As locking ring 12 passes the bent section of locking member 130, the distance between locking members 130 decreases, such that locking ring 12 is held in place by locking members 130.

As shown in FIG. 3, mounting guide 200 is formed to have a shape corresponding to the shape of main body 100. Mounting body 100 slidably mounted onto the outer circumference surface of main body 100, and locking members 130 are accommodated in mounting guide 200.

Mounting guide 200 slides in the longitudinal direction of main body 100, thereby enabling locking members 130 to be locked by or released from locking ring 12.

As shown in FIG. 3, mounting guide 200 includes a coupling plate 210 provided therein. Coupling plate 210 has insertion holes 210a formed therein, to accommodate locking members 130 when mounting guide 200 is slidably moved along the longitudinal axis of main body 100z.

In a further example embodiment, a retainer 300, which is illustrated in FIG. 4, may inserted into mounting guide 200 in order to guide the moving range of the mounting guide 200, which slides along the longitudinal axis of main body 100.

As shown in FIG. 2, main body 100 has a pair of movement guides 110a formed in the outer circumferential surface of body member 110. Movement guides 110a are configured in a slot shape having a predetermined insertion area and guide the sliding motion of mounting guide 200. One end portion of retainer 300, which has passed through mounting guide 200, may be removably inserted into the movement guide 110a and is moved along the movement guide 110a when the mounting guide 200 performs a sliding motion. Because retainer 300 cannot move past the edges of movement guide 110a, mounting guide 200 is prevented from being separated from main body 100.

Mounting guide 200 has therein a coupling hole H formed at a position corresponding to the position of movement guide 110a. When retainer 300 is inserted through coupling hole H, one end portion of retainer 300 is inserted into movement guide 110a. Accordingly, when mounting guide 200 slides along the longitudinal axis of main body 100, the movement range of mounting guide 200 is limited by the length of movement guide 110a, and movement of retainer 300 to the edges of movement guide 110a prevented mounting guide 200 from separating from main body 100.

Operation of the quick connector according to the example embodiment of the present disclosure configured as described above will now be described.

First, as shown in FIG. 5, when locking members 130 are positioned such that locking ring 12 is locked by locking members 130, mounting guide 200 slides in order to connect and fix main body 100 to tube 10.

When locking ring 12 passes through locking members 130, the distance between locking members 130 is greater than the outer diameter of locking ring 12, which protrudes around the outer peripheral surface of tube 10. When mounting guide 200 then slides to a position at which mounting guide 200 surrounds the entire region of the locking members 130, the distance between the locking members 130 decreases, and the locking members 130 enclose locking ring 12. As a result, main body 100 and tube 10 are securely engaged with each other.

In an example embodiment, movement guide 110a, having retainer 300 inserted therein, which defines the movement range of mounting guide 200 is configured such that mounting guide 200 cannot slide to a position beyond the end of locking members 130. As a result, the position of mounting guide 200 when it is coupled to main body 100 and locking ring 12 is locked by locking members 130 is maintained.

Conversely, main body 100 may be easily disengaged from tube 10 by gripping and sliding mounting guide 200 in a direction opposite to the above-described sliding engagement direction.

At this time, due to the elastic properties of the material of locking members 130, locking members 130 separate from each other and return to the initial position as mounting guide 200 slides, thereby making it possible to disengage main body 100 from tube 10.

Compared with the prior art, in which a user must press a button provided at a main body and simultaneously pull the main body in order to disengage the main body from a tube, the quick connector according to the present disclosure has a considerably more simple disengagement operation wherein main body 100 is easily disengaged from tube 10 merely by pulling mounting guide 200 without a manipulation of pressing an additional button. Accordingly, engagement/disengagement performance and convenience of use of main body 100 of the connector are improved.

As is apparent from the above description, the present disclosure provides a quick connector, in which a connector body is provided with locking members, which are configured to be locked around a locking ring provided around a tube, and the locking members are locked released from the locked state merely by sliding a mounting guide, which is coupled to the connector body. Accordingly, the connector body is easily engaged or disengaged with/from the tube having the locking ring.

Further, according to the present disclosure, engagement/disengagement of the connector body with/from the tube having the locking ring is performed only by gripping the mounting guide, that is, only by sliding the mounting guide, thereby improving convenience of engagement/disengagement of the connector body with/from the tube having the locking ring.

The disclosure describes in detail example embodiments. However, it will be appreciated by those skilled in the art that changes may be made in these embodiments without departing from the principles and spirit of the disclosure, the scope of which is defined in the appended claims and their equivalents.

What is claimed is:

1. A quick connector configured to be coupled to a locking ring provided around an outer peripheral surface of a tube, through which fluid flows in or out, the quick connector comprising:
    a main body accommodating the tube therein and including at least one locking member, configured to be locked around the locking ring and being bent toward the interior of the main body; and
    a mounting guide slidably connected to an outer peripheral surface of the main body and accommodating the locking member therein, the mounting guide being configured to slide along a longitudinal axis of the main body so as to enable the locking member to be locked around the locking ring or to be released from a locked state;
    wherein the main body further includes:
        a body member configured to correspond to a shape of the tube so as to communicate with the tube; and
        an at least one connector,
        wherein the at least one connector extends a predetermined length from the body member and is positioned to face opposite sides of the locking ring, and
        wherein the at least one locking member is bent at respective ends of the connector toward the locking ring so as to be lockable around the locking ring;
    wherein the main body further includes at least one movement guide formed on a circumferential surface of the body member;
    wherein the mounting guide includes a coupling plate provided therein, and the coupling plate has insertion holes formed therein to accommodate locking members when the mounting guide is slidably moved along the longitudinal axis of the main body;
    wherein the at least one movement guide is a slot having a predetermined insertion area so as to guide a sliding motion of the mounting guide;
    wherein the mounting guide has a coupling hole formed at a position corresponding to the position of the movement guide on the main body; and
    wherein the mounting guide further comprises a retainer that is removably inserted into the coupling hole, has one end portion formed to be inserted into the at least one movement guide, and moves along the insertion area.

2. The quick connector of claim 1, comprising a pair of locking members formed to be locked around the locking ring.

3. The quick connector of claim 2, wherein the pair of locking members is comprised of an elastic material.

4. The quick connector of claim 2, wherein the pair of locking members is configured such that, in an initial position, the distance between the locking members is greater than an outer diameter of the locking ring.

5. The quick connector of claim 4, wherein, when the mounting guide slides toward the locking members along the longitudinal axis of the main body, the mounting guide presses the locking members so that the distance between the locking members decreases to a value less than or equal to the outer diameter of the locking ring.

6. The quick connector of claim 4, wherein one end portion of the retainer is inserted into the at least one movement guide so that the mounting guide does not separate from the main body.

\* \* \* \* \*